United States Patent [19]

Yamashita

[11] Patent Number: 5,182,864
[45] Date of Patent: Feb. 2, 1993

[54] APPARATUS FOR MEASURING CAR FRAME

[76] Inventor: Ryuzo Yamashita, No. 53-9, Matsugaoka 3-chome, Funabashi-shi, Chiba-ken, Japan

[21] Appl. No.: 757,936

[22] Filed: Sep. 12, 1991

[51] Int. Cl.$^5$ .................. G01B 5/00; G01D 21/00
[52] U.S. Cl. .......................... 33/288; 33/608
[58] Field of Search ............. 33/608, 288, 600, 545, 33/546, 552

[56] References Cited

U.S. PATENT DOCUMENTS

| | | | |
|---|---|---|---|
| 2,581,021 | 1/1952 | Jacobsen et al. | 33/288 |
| 2,713,211 | 7/1955 | Fella | 33/288 |
| 3,057,074 | 10/1962 | Sidwell | 33/288 |
| 3,611,575 | 10/1971 | Chartier | 33/288 |
| 4,006,532 | 2/1977 | Hallman | 33/288 |
| 4,319,402 | 3/1982 | Martin | 33/608 |
| 4,479,305 | 10/1984 | Wendl et al. | 33/288 |
| 4,561,187 | 12/1985 | Powell | 33/608 |
| 4,689,888 | 9/1987 | Aldrich et al. | 33/600 |
| 4,719,704 | 1/1988 | Hogg | 33/608 |

FOREIGN PATENT DOCUMENTS

| | | |
|---|---|---|
| 58-89443 | 5/1983 | Japan . |
| 59-57101 | 4/1984 | Japan . |
| 60-202305 | 10/1985 | Japan . |
| 62-198552 | 9/1987 | Japan . |
| 63-176759 | 7/1988 | Japan . |

Primary Examiner—Thomas B. Will
Attorney, Agent, or Firm—Wenderoth, Lind & Ponack

[57] ABSTRACT

A car frame measuring apparatus is disclosed, which has a three-dimensional measurement assembly comprising a pair of x-axis units, a y-axis unit mounted for longitudinal movement on the x-axis units and having a center piece provided at the center, a pair of z-axis unit bases mounted for transversal movement on the y-axis unit, z-axis unit holders each mounted on each z-axis unit base and provided with a z-axis unit capable of being extended by a spring, and a center piece having each end coupled by a chain to each z-axis unit. The opposite side z-axis units can be made to be at an equal distance from the center of the y-axis unit by aligning the last mentioned center piece and the center piece on the y-axis unit.

2 Claims, 7 Drawing Sheets

FIG. 5
FIG. 6
FIG. 7
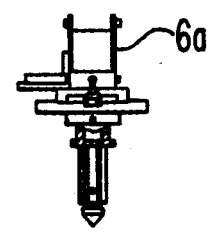
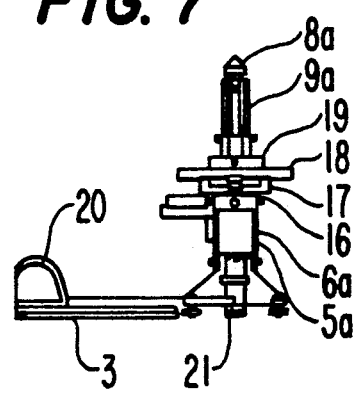

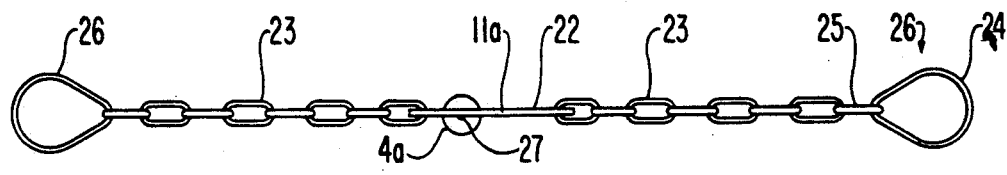
FIG. 8
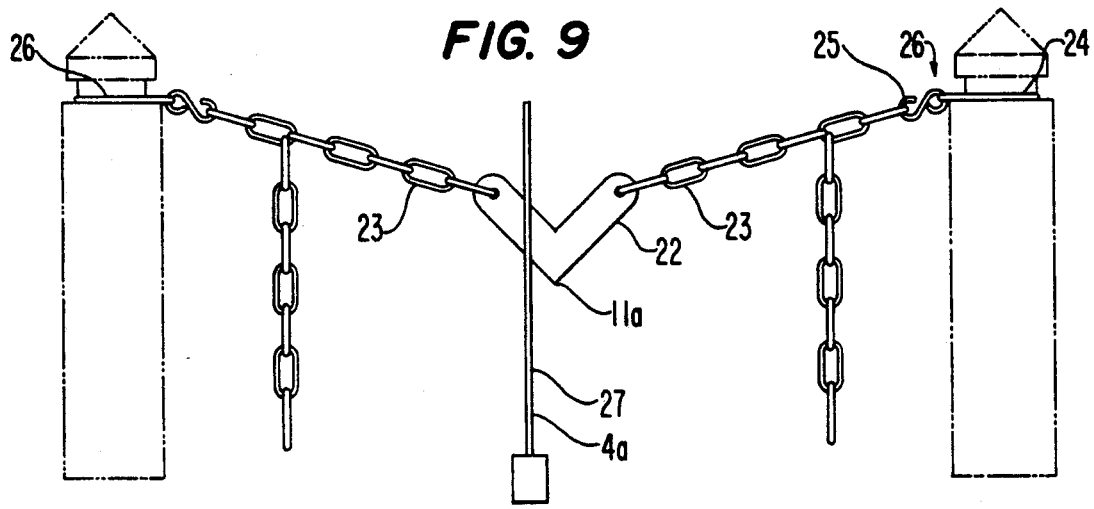
FIG. 9
FIG. 10
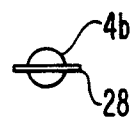
FIG. 11
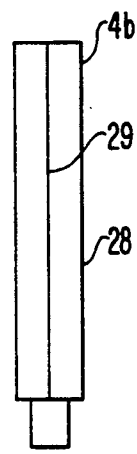

APPARATUS FOR MEASURING CAR FRAME

BACKGROUND OF THE INVENTION

1. Field of the Invention

This invention relates to an apparatus for measuring a car frame, and is used when repairing a car frame deformed in an accident or the like.

2. Prior Art

A car frame repairing apparatus is used to repair a car frame deformed due to an accident or the like. It has a working base, on which a deformed car frame is supported via a car frame holder means. In this state, the car frame is repaired by applying repairing force to it while measuring the car frame with a car frame measuring apparatus. FIGS. 15 to 17 show a car frame repairing apparatus which is disclosed in Japanese Utility Model Application No. 228,926/1989.

With this apparatus, a deformed car frame to be repaired is placed on a working base and held in position by clamping it with clamps of the car frame holder means. A chain is coupled to an oil hydraulic cylinder of the repairing apparatus and also to the car frame in this state, and the oil hydraulic cylinder is extended to produce a stress in the chain so as to provide a repairing force. The car frame is measured with a car frame measuring apparatus, which is disposed beneath the car frame.

However, since the car frame measuring apparatus is disposed beneath the car frame, it is hazardous and hence impossible to read the output of the measuring apparatus during the repairing operation, that is, it is necessary to interrupt the repairing operation for reading the output of the car frame measuring apparatus.

SUMMARY OF THE INVENTION

As object of the invention is to provide a car frame measuring apparatus, which can obviate the above drawback inherent in the prior art and permits remote measurement of a car frame from the outside thereof while a repairing operation is carried out.

To attain this object of the invention, there is provided a car frame measuring apparatus, which has a three-dimensional, i.e., x-, y- and z-axis, measurement assembly, comprising a pair of x-axis units constituted by hexagonal steel rails, a y-axis unit mounted for longitudinal movement on the x-axis units and having a center piece provided at the center, a pair of z-axis unit bases mounted for transversal movement on the y-axis unit, z-axis unit holders each mounted on each z-axis unit base and provided with a z-axis unit capable of being extended by a spring, and a center piece capable of suspending an object with a chain or the like and having each end coupled by a chain to each z-axis unit, and with which the opposite side z-axis units can be made to be at an equal distance from the center of the y-axis unit by aligning this center piece and the center piece on the y-axis unit.

BRIEF DESCRIPTION OF THE DRAWINGS

FIG. 5 is a side view of the same;

FIG. 6 is another side view of the same;

FIG. 7 is a further side view of the same;

FIG. 8 is a plan view, with some parts omitted, showing a further embodiment of the car frame measuring apparatus;

FIG. 9 is a front view of the same;

FIG. 10 is a plan view, with some parts omitted, showing a still further embodiment of the car frame measuring apparatus;

FIG. 11 is a front view of the same;

DETAILED DESCRIPTION OF THE PREFERRED EMBODIMENTS

Preferred embodiments of the invention will now be described with reference to the drawings.

Figure 1:
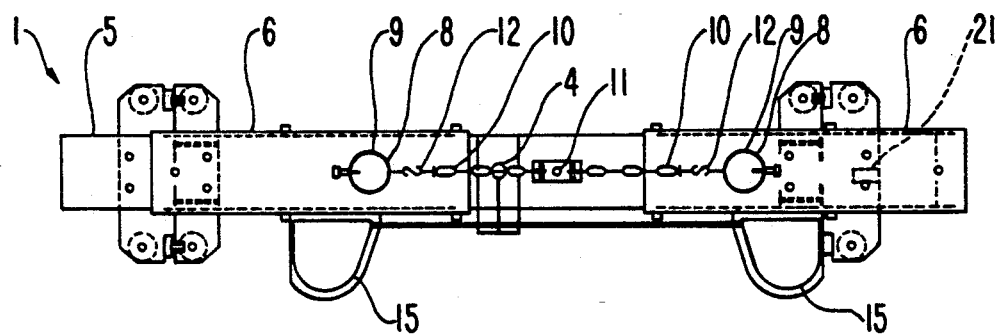
FIG. 1 is a plan view, with some parts omitted, showing an embodiment of the car frame measuring apparatus according to the invention.
Figure 2:
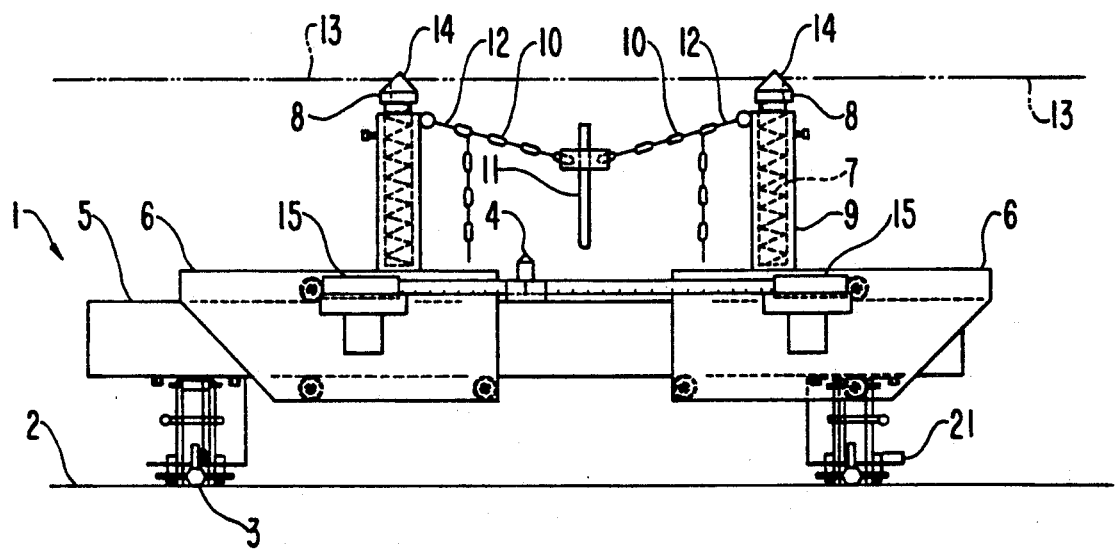
FIG. 2 is a front view of the same.
Figure 3:
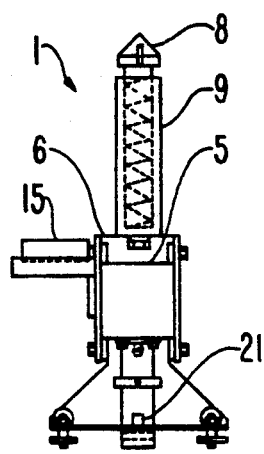
FIG. 3 is a side view of the same.
Figure 4:
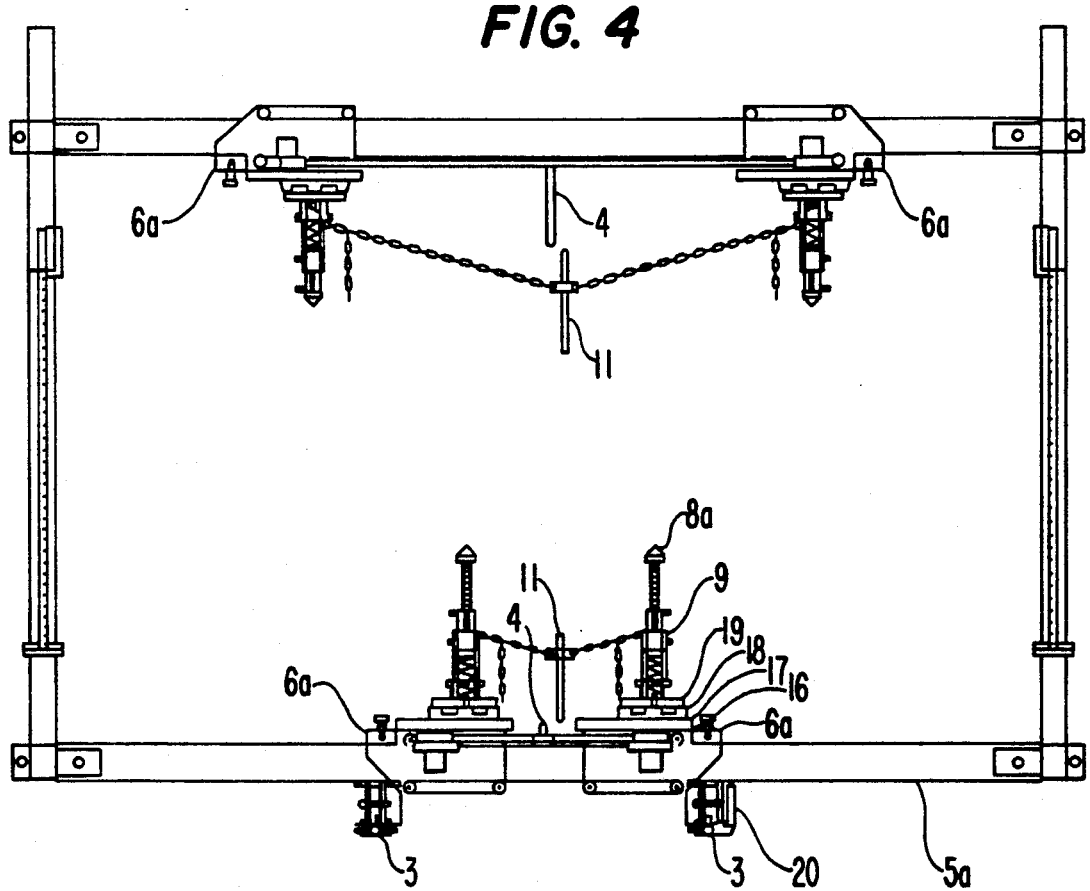
FIG. 4 is a front view, with some parts omitted, of a different embodiment of the car frame measuring apparatus.

FIGS. 1 to 3 show a first embodiment of the car frame measuring apparatus according to the invention. The apparatus is generally designated at 1. On a working base 2 is installed a pair of x-axis units 3 of the apparatus 1. A y-axis unit 5 having a center piece 4 provided at the center is mounted for longitudinal movement on the x-axis units 3. A pair of z-axis unit bases 6 is mounted for transversal movement on the y-axis unit 5. On each z-axis unit base 6 is mounted a z-axis unit holder 9 holding a z-axis unit 8 capable of being extended by a spring 7. Designated at 11 is a center piece, which has each side coupled by a chain 10 to a hook coupled to a corresponding z-axis unit holder 9. Designated schematically at 13 is a car frame, which is held by a car frame holder means of the working base 2. The car frame 13 has a central portion formed with a pair of longitudinally spaced-apart holes 14. The upper end of each z-axis unit 8 provided on the y-axis unit 5 is inserted in a corresponding hole 14. The center line of the working base 2 and the center line of the car frame 13 can be aligned by displacing the car frame 13 transversally so as to align the center pieces 4 and 11. Where the x-axis units 3 are not secured to the working base 2, they are displaced by securing them to each other with connecting rods or the like.

Designated at 15 are means for measuring the distance from the center of the y-axis unit to each z-axis unit base 6.

FIGS. 4 to 7 show a portion of the apparatus for measuring a deformed portion of the car frame, which is held in position by aligning the center line of the working base and the car frame center line. In this case, the z-axis unit bases 6a are modified for application to car frames deformed in the length direction. More specifically, transversal rails 17 are secured to a base 16, and longitudinal rails 18 are mounted for transversal movement on the transversal rails 17. Upper bases 19 are mounted for longitudinal movement on the longitudinal rails 18. Z-axis unit holders 9a are mounted on the upper bases 19. It is possible as an alternative arrangement to secure the longitudinal rails 18 to the base 16 and mount the upper bases 19 for longitudinal movement on the upper bases 19.

Each x-axis unit 3 has an end provided with a measuring means 20. The end of the means 20 is coupled to a measure hook section 21 of the y-axis unit 5a to permit measurement of the distance from the end of the x-axis unit 3 to the section 21.

FIGS. 8 and 9 show a modification of center pieces 4a and 11a. The center piece 11a is a V-shaped piece 22 having each end provided with a chain 23, the other end of which is coupled by a hook 25 to a coupler 26.

The center piece 4a is constituted by a thin rod 27.

FIGS. 10 and 11 show a different modification of the center piece 4b. This center piece 4b is provided with a transparent elongate plate 28 having a thin indicator line 29.

Figure 12:
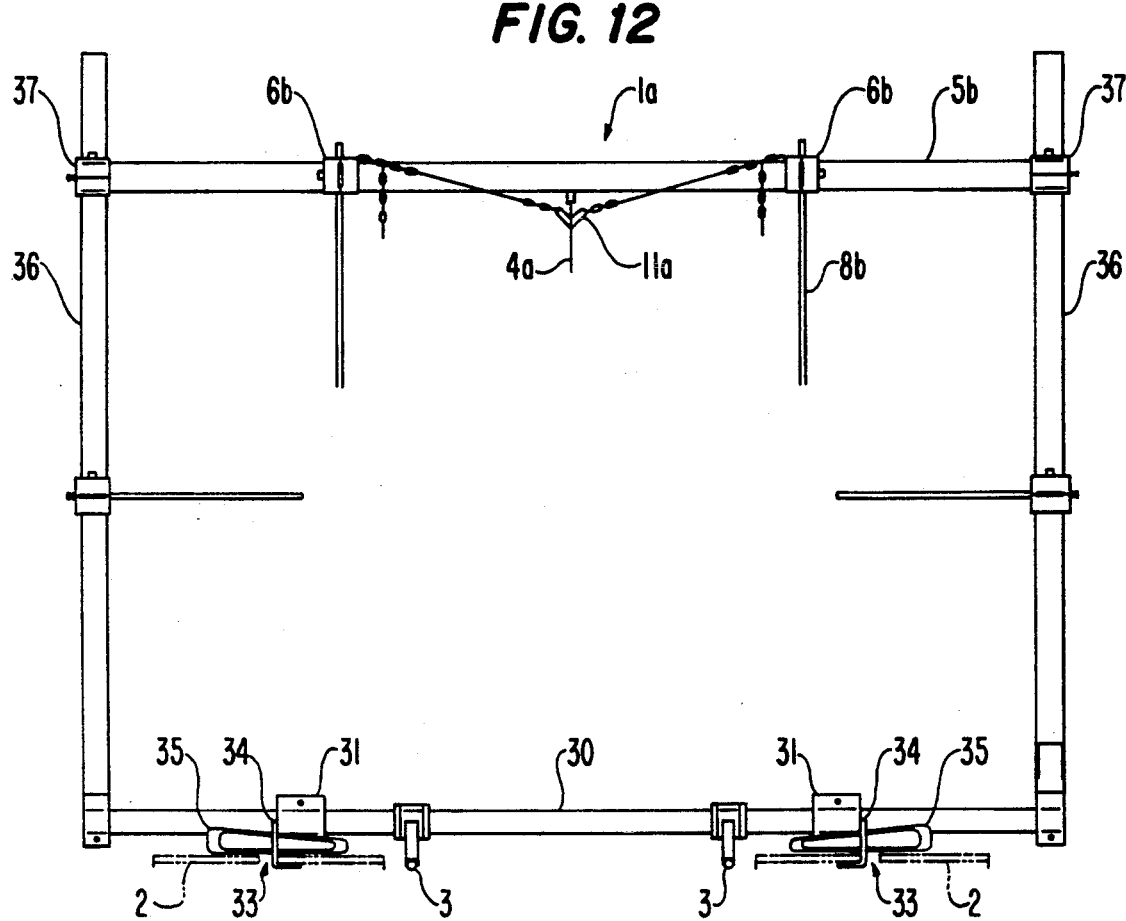
FIG. 12 a front view, with some parts omitted, showing a yet further embodiment of the car frame measuring apparatus.
Figure 13:
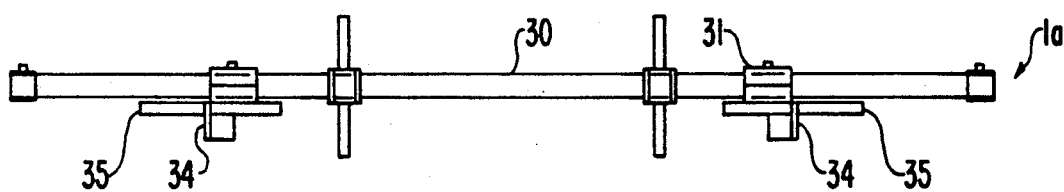
FIG. 13 is a plan view of the same.
Figure 14:
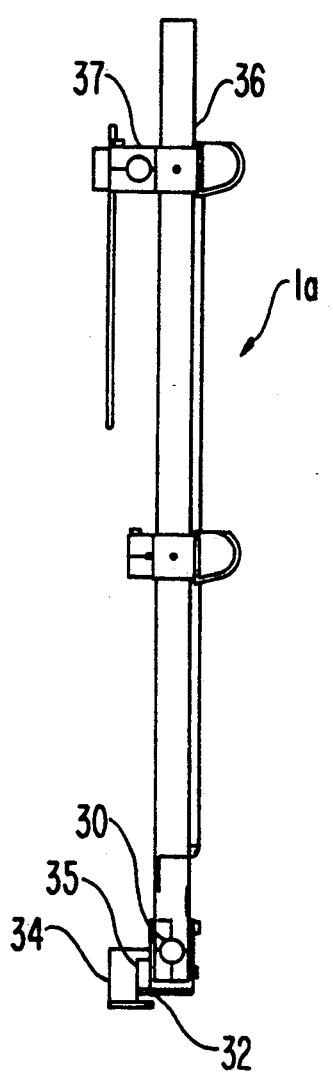
FIG. 14 is a side view of the same.
Figure 15:
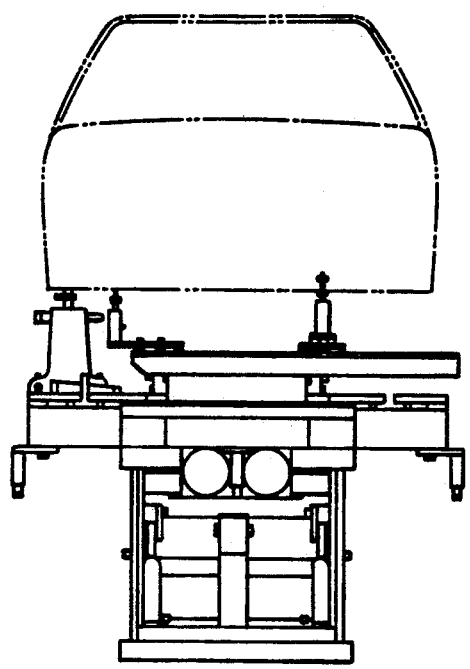
FIG. 15 is an elevation view showing a prior art car frame measuring apparatus.
Figure 16:
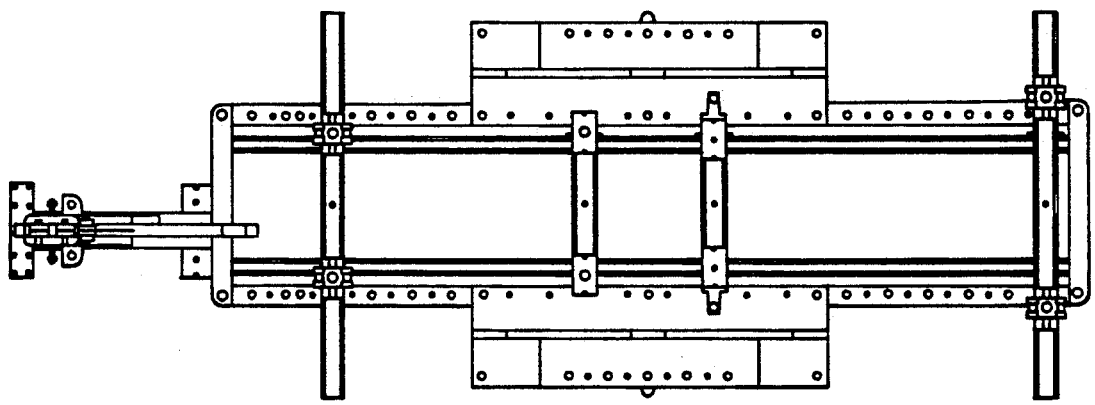
FIG. 16 is a plan view of the same.
Figure 17:
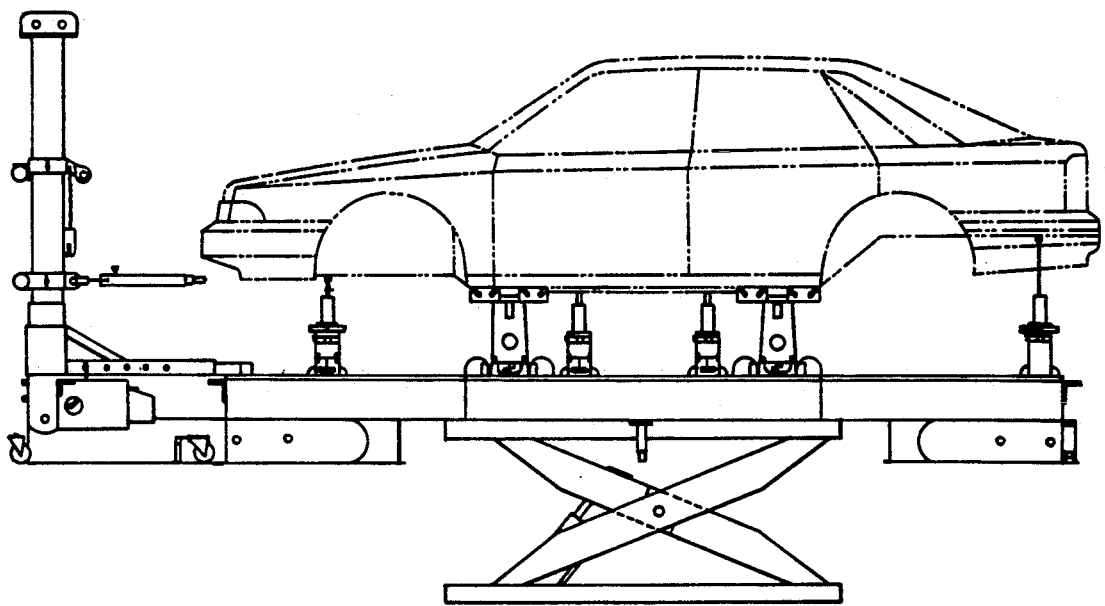
FIG. 17 is a side view of the same.

FIGS. 12 to 14 show a different embodiment of the car frame measuring apparatus 1a. In this embodiment, a shaft 30 is mounted for rotation on x-axis units 3, and a pair of fixing means 31 is used to secure the shaft 30. More particularly, a base 32 of each fixing set 31 is secured by a hook 34 inserted in a groove 33 of the working base 2 and a wedge 35 to the working base 2. A pair of poles 36 are provided on the opposite ends of the shaft 30. Vertically displaceable fixing elements 37 are provided on each pole 36. A y-axis unit 5b having a center piece 4a is mounted for rotation in the fixing sets 37. The y-axis unit 5b is provided with a pair of z-axis unit bases 6b each carrying a z-axis unit 8b. A center piece 11a is coupled to the z-axis units 8b.

As has been described in the foregoing, with the car frame measuring apparatus according to the invention a deviation between the center line of the working base and that of the car frame, or an extent of deformation of the car frame, can be confirmed by visually confirming the position of the center piece on the y-axis unit provided on the x-axis units on the working base and the center piece coupled to the pair of z-axis units, each of which is held by the z-axis unit holder on the z-axis unit base on the y-axis unit and is capable of being extended by a spring, and which have their tops inserted in a pair holes of the car frame. Also, the car frame can be repaired symmetrically with respect to the longitudinal center line by carrying out the repairing operation such as to align the two center pieces. Further, the height level of the car frame on each side can be confirmed from the height of each z-axis unit extending upright from the holder thereof. As a whole, the car frame measurement apparatus according to the invention has many useful effects.

I claim:

1. An apparatus for measuring a car frame, comprising:
    a pair of x-axis units extending in an x-axis direction of a car frame;
    a y-axis unit mounted on said x-axis units for movement in an x-axis direction of a car frame and having a y-axis center piece provided at the center thereof between said x-axis units;
    a pair of z-axis unit bases mounted on said y-axis unit for movement in a y-axis direction of a car frame;
    a z-axis unit means mounted on each of said z-axis unit bases capable of being extended in a z-axis direction of a vehicle frame;
    a z-axis center piece; and
    a chain extending from said z-axis center piece to each z-axis unit means, said chains being equal in length.

2. An apparatus as claimed in claim 1 in which each said z-axis unit means has a z-axis unit holder and a z-axis unit extendible therefrom in the z-axis direction, said chains being connected to said z-axis unit holders.

* * * * *